(12) United States Patent
Kira (10) Patent No.: US 7,762,221 B2
(45) Date of Patent: Jul. 27, 2010

(54) VALVE TIMING CONTROL APPARATUS (75) Inventor: Naoki Kira, Kariya (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 356 days.

(21) Appl. No.: 11/884,449

(22) PCT Filed: Feb. 10, 2006

(86) PCT No.: PCT/JP2006/302323

§ 371 (c)(1),
(2), (4) Date: Aug. 16, 2007

(87) PCT Pub. No.: WO2006/095530

PCT Pub. Date: Sep. 14, 2006

(65) Prior Publication Data

US 2009/0205592 A1    Aug. 20, 2009

(30) Foreign Application Priority Data

Mar. 4, 2005    (JP)    .............................. 2005-060488

(51) Int. Cl.
*F01L 1/34* (2006.01)
(52) U.S. Cl. .................. 123/90.17; 123/90.15; 464/160
(58) Field of Classification Search .............. 123/90.15, 123/90.16, 90.17, 90.18, 90.12, 90.13; 137/625, 137/625.69; 464/1, 2, 160
See application file for complete search history.

(56) References Cited

U.S. PATENT DOCUMENTS 5,493,902 A    2/1996    Glidewell et al.

(Continued)

FOREIGN PATENT DOCUMENTS

DE    19757594 A1    7/1999

(Continued)

OTHER PUBLICATIONS

Office Action dated May 14, 2009 in corresponding Japanese Application No. 2005-060488 and English translation of Office Action.

(Continued)

*Primary Examiner*—Ching Chang
(74) *Attorney, Agent, or Firm*—Buchanan Ingersoll & Rooney PC

(57) ABSTRACT

To provide a fluid control valve capable of providing appropriate responsiveness of the valve member or capable of compensating for fluid shortage in the case of low fluid pressure, by positively controlling the oscillation condition of the valve member according to such conditions as the temperature or pressure of the fluid.

The valve includes a valve body 4 for controlling supply of fluid according to a position of a valve member 41, an electromagnetic driving means 5 for displacing a position of the valve member 41 according to an amount of power supplied thereto, and a controlling means 6 for controlling the power supply amount to the electromagnetic driving means 5 by a duty ratio of a pulse-width modulated signal. The controlling means 6 varies the pulse width modulated signal so as to vary oscillation amplitude of the valve member 41 according to a condition of at least either one of temperature and pressure of the fluid and then outputs such varied pulse width modulated signal to the electromagnetic driving means 5.

3 Claims, 7 Drawing Sheets

U.S. PATENT DOCUMENTS

| | | |
|---|---|---|
| 6,155,654 A * | 12/2000 | Oyama .................... 303/117.1 |
| 6,308,516 B1 | 10/2001 | Kamada |
| 6,367,452 B1 | 4/2002 | Shima et al. |
| 7,004,128 B2 * | 2/2006 | Majima et al. ........... 123/90.17 |
| 2003/0062030 A1 | 3/2003 | Oashi |
| 2004/0187820 A1 | 9/2004 | Kondo |

FOREIGN PATENT DOCUMENTS

| | | |
|---|---|---|
| DE | 102004016554 A1 | 10/2005 |
| EP | 1298307 A2 | 4/2003 |
| GB | 2287102 A | 9/1995 |
| JP | 01-216179 A | 8/1989 |
| JP | 9-269803 A | 10/1997 |
| JP | 09-324685 A | 12/1997 |
| JP | 11-287351 A | 10/1999 |
| JP | 11-336701 A | 12/1999 |
| JP | 2001-065373 A | 3/2001 |
| JP | 2001-182565 A | 7/2001 |
| JP | 2003-042330 A | 2/2003 |
| JP | 2004-301224 A | 10/2004 |
| JP | 2005-019617 A | 1/2005 |
| JP | 2006-040200 A | 2/2006 |

OTHER PUBLICATIONS

Extended European Search Report dated Dec. 22, 2009 issued in the corresponding European application.
PCT/ISA/210—International Search Report ,May 16, 2006.
PCT/ISA/237—May 16, 2006.

* cited by examiner

VALVE TIMING CONTROL APPARATUS

TECHNICAL FIELD

The present invention relates to a fluid control valve including a valve body for controlling supply of fluid according to a position of a valve member, an electromagnetic driving means for displacing a position of the valve member according to an amount of power supplied thereto, and a controlling means for controlling the power supply amount to the electromagnetic driving means by a duty ratio of a pulse-width modulated signal. The invention relates also to a valve timing control apparatus using the fluid control valve.

BACKGROUND ART

As a technique relating to control of a hydraulic control valve for use in a valve timing control apparatus for an internal combustion engine, for instance, Patent Document 1 identified below discloses a technique relating to a control apparatus as described below. Namely, this control apparatus is a duty-ratio control apparatus operable to control an amount of power supplied to an electromagnetic actuator by varying a ratio between an ON duration and an OFF duration in one duty cycle. In operation, this control apparatus effects control operations for decreasing one cycle period (increasing the PWM frequency) with decrease in the power supply amount to the electromagnetic actuator and increasing the one cycle period (decreasing the PWM frequency) with increase in the power supply amount to the electromagnetic actuator.

This control apparatus is intended to adjust dither oscillation of the spool (valve member) of the electromagnetic actuator within a predetermined range even when there occurs change in the condition of the electromagnetic force acting on this spool due to variation in the amount of power supplied thereto. More particularly, when the power supply amount to the electromagnetic actuator is small, the one cycle period is reduced thereby to restrict the pulsate electromagnetic force due to the ON/OFF current so as to restrict increase in the dither amplitude, so that occurrence of hunting of the spool of the electromagnetic actuator may be restricted. Conversely, when the power supply amount to the electromagnetic actuator is large, the one cycle period is increased for increasing the pulsating electromagnetic force generated by the ON/OFF current, so as to maintain kinematic friction condition by dither oscillation of an appropriate amplitude, thus preventing deterioration in the responsiveness of the spool of the electromagnetic actuator.

Patent Document 1: Japanese Patent Application "Kokai" No. 2004-301224 (page 3, page 8, FIG. 1)

DISCLOSURE OF THE INVENTION

Problem to be Solved by Invention

Incidentally, the movement of a valve member of a fluid control valve exemplified by a hydraulic control valve is influenced by such condition as viscosity of the fluid controlled by this control valve. More particularly, when the viscosity of the fluid is high, the valve member, when being moved, will encounter large resistance from the fluid, so that its responsiveness to a control signal is deteriorated. On the other hand, when the fluid viscosity is low, the valve member, when being moved, will encounter small resistance from the fluid, so that the responsiveness to the control signal can be too sensitive. In this case, as the valve member is moved in response to the pulses of the PWM signal as control signals, there can occur excessive oscillation in the valve member. Accordingly, it is desired to control the oscillation condition of the valve member so as to obtain appropriate responsiveness of the valve member to the control signals, depending on the fluid condition such as its viscosity. However, such control according to the fluid condition is not effected in the control apparatus disclosed in the Patent Document 1 cited above.

Further, the appropriate operational condition of the valve member of the fluid control valve sometimes differs, depending on the pressure of the fluid present within a fluid circuit incorporating this control valve. For instance, when e.g. there is a large leak amount of the fluid at some portion of the fluid circuit on the downstream side of the fluid control valve, if the valve member is maintained at a closing position thereof for closing a supply port, the fluid pressure on this downstream side will decrease with lapse of time. In such case, if the pressure of the fluid inside the fluid circuit is low from the beginning, the fluid pressure on the downstream side of the fluid control valve may fail to reach a required pressure. Therefore, in such case, it is desired to operate the control valve in such a manner as to compensate for shortage of the fluid. However, such control according to the downstream condition of the control valve is not effected in the control apparatus disclosed in the Patent Document 1.

The present invention has been made in view of the above-described problems. Its object is to provide a fluid control valve capable of providing appropriate responsiveness of the valve member or capable of compensating for fluid shortage in the case of low fluid pressure, by positively controlling the oscillation condition of the valve member according to such conditions as the temperature or pressure of the fluid, as well as a valve timing control apparatus using such fluid control valve.

Means for Achieving the Object

For achieving the above-noted object, according to the present invention, there is provided a fluid control valve including a valve body for controlling supply of fluid according to a position of a valve member, an electromagnetic driving means for displacing a position of the valve member according to an amount of power supplied thereto, and a controlling means for controlling the power supply amount to the electromagnetic driving means by a duty ratio of a pulse-width modulated signal, characterized in that said controlling means varies the pulse width modulated signal so as to vary oscillation amplitude of the valve member according to a condition of at least either one of temperature and pressure of the fluid and then outputs such varied pulse width modulated signal to the electromagnetic driving means.

With this characterizing construction, by varying the pulse width modulated signal, it is possible to positively control the oscillation amplitude of the valve member according to a condition of at least either one of temperature and pressure of the fluid, so that there can be obtained appropriate responsiveness of the movement of the valve member in response to the control signal from the controlling means which signal is constituted by the pulse width modulated signal. Further, by controlling the oscillation amplitude of the control valve according to the pressure of the fluid inside the fluid circuit, it becomes possible to effect control for causing the valve member to be moved so as to compensate for shortage of the fluid, so that the pressure of the fluid on the downstream side of the fluid control valve can be maintained appropriate for instance.

Preferably, in the above construction, said controlling means varies the pulse width modulated signal so as to increase the oscillation amplitude of the valve member when the temperature of the fluid is within a low temperature range lower than a normal temperature range and outputs this varied signal to the electromagnetic driving means.

When the fluid temperature is in the low temperature range lower than the normal temperature range, the viscosity of the fluid is generally high. Then, with the above construction, the oscillation amplitude of the valve member is increased when the fluid temperature is low, hence the viscosity is high. This prevents inadvertent locking or stuck condition of the valve member when the fluid viscosity is high. Further, the valve member is moved while pushing/pulling the fluid with a relatively large amplitude of oscillation. With this, the valve member can be moved quickly even in a fluid of high viscosity. Therefore, the responsiveness of the valve member movement according to the duty ratio can be enhanced.

Preferably and alternatively, said controlling means varies the pulse width modulated signal so as to increase the oscillation amplitude of the valve member, provided at least that the valve member is located at a closing position for closing a supply port of the fluid, when the pressure of the fluid is within a low pressure range lower than a normal pressure range, and outputs this varied signal to the electromagnetic driving means.

With the above construction, when the pressure of the fluid in a fluid circuit is in the low pressure range lower than the normal pressure range, hence, when there is the possibility of the fluid pressure on the downstream side of the valve member being unable to reach a required pressure, the valve member is moved with a relatively large amplitude of oscillation. With this, when the valve member is located at a closing position for closing a supply port of the fluid, the valve member can be operated to momentarily open/close the supply port so as to supply the fluid to the downstream side for compensation for the shortage thereof. Therefore, the pressure of the fluid on the downstream side of the valve member can be maintained appropriately.

Preferably, said controlling means varies frequency of the pulse width modulated signal to a low frequency lower than a normal frequency range so as to increase the oscillation amplitude of the valve member and outputs this varied signal to the electromagnetic driving means.

With the above, the oscillation amplitude of the valve member can be increased by the simple control scheme of lowering the frequency of the pulse width modulated signal and the control operation according to the fluid temperature or pressure can be effected appropriately.

According to a further characterizing feature of the present invention, there is provided a fluid control valve including a valve body for controlling supply of fluid according to a position of a valve member, an electromagnetic driving means for displacing a position of the valve member according to an amount of power supplied thereto, and a controlling means for controlling the power supply amount to the electromagnetic driving means by a duty ratio of a pulse-width modulated signal, characterized in that said controlling means varies frequency of the pulse width modulated signal to a lower frequency than a normal frequency and then outputs such varied pulse width modulated signal to the electromagnetic driving means, upon detection of a malfunction of said valve member.

With this characterizing construction, when there occurs a malfunction of the valve member due to e.g. intrusion of a foreign object to a sliding portion of the valve member, the valve member can be oscillated with increased amplitude, so that the foreign object or the like can be eliminated. And, this operation at the time of abnormality can be effected by the simple control scheme of lowering the frequency of the pulse width modulated signal.

According to a further aspect of the present invention, there is provided a valve timing control apparatus comprising:

a driving rotational member rotatable in synchronism with a crank shaft of an internal combustion engine;

a driven rotational member disposed coaxial with said driving rotational member and rotatable in synchronism with a cam shaft of the internal combustion engine;

a fluid pressure chamber formed in at least one of said driving rotational member and said driven rotational member, said fluid pressure chamber being divided into a phase advanced angle chamber and a phase retarded angle chamber; and said fluid control valve having the above-described characterizing feature, for controlling supply or discharge of operational fluid to/from one or both of said phase advanced angle chamber and said phase retarded angle chamber.

With the above-described characterizing construction, even when the operational fluid supplied to one or both of the phase advanced angle chamber and the phase retarded angle chamber has a low temperature, hence, a high viscosity, it is possible to obtain appropriate responsiveness in the movement of the valve member in response to the control signal from the controlling means which signal is constituted by the pulse width modulated signal. Further, even when the pressure of the fluid in the fluid circuit is low, hence, there is the possibility of the fluid pressure on the downstream side of the valve member failing to reach a required pressure, it is possible to maintain appropriate pressure in the phase advanced angle chamber and the phase retarded angle chamber by compensating for the shortage in the operational fluid. Therefore, it is possible to enhance the responsiveness of the phase control of the crank shaft and the cam shaft of the valve timing control apparatus or to increase the operational reliability of the valve timing control apparatus.

BEST MODE OF EMBODYING THE INVENTION

First Embodiment

Next, a first embodiment of the present invention will be described with reference to the accompanying drawings. In below, there will be described an example case where the present invention is applied to a hydraulic control valve 3 of a valve timing control apparatus 2 in an engine (internal combustion engine) 1.

Figure 1:
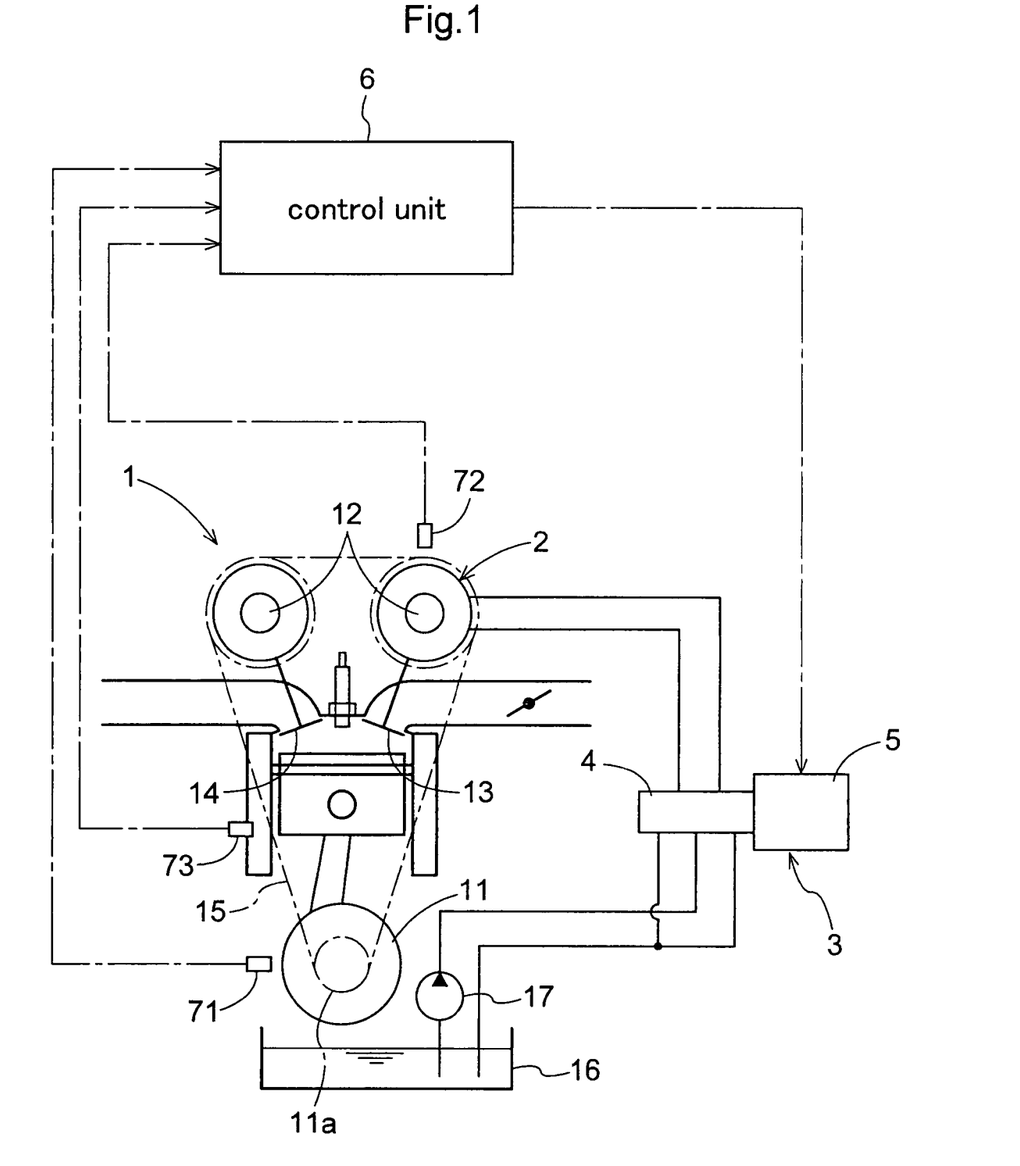
[FIG. 1] a view showing a general construction of an engine having a valve timing control apparatus relating to a first embodiment of the present invention.
Figure 2:
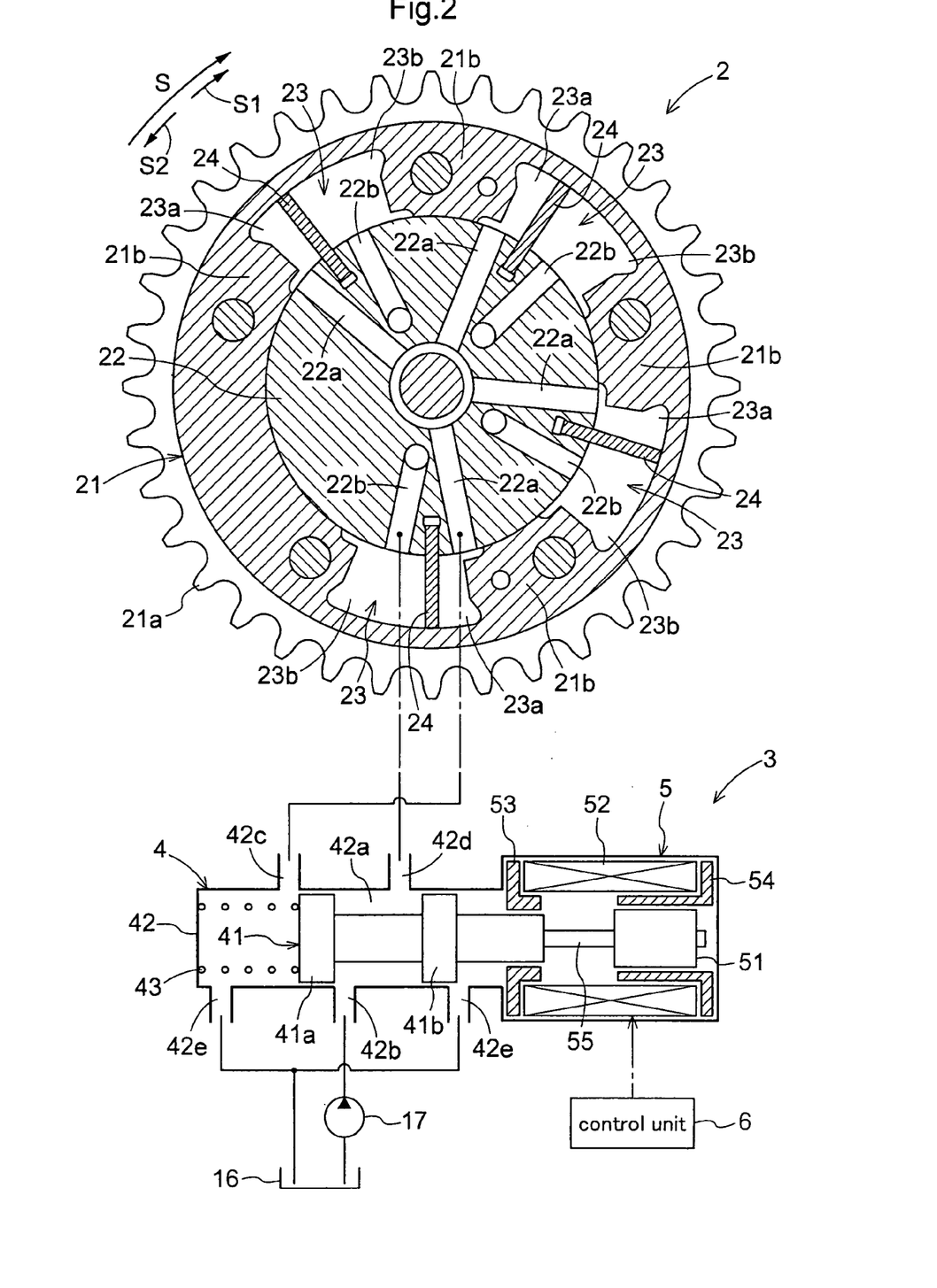
[FIG. 2] a view showing a construction of the valve timing control apparatus including a hydraulic control valve relating to the first embodiment of the present invention.

FIG. 1 is a schematic showing a general construction of the engine 1 employing the valve timing control apparatus 2 relating to the present embodiment. FIG. 2 is a view showing a construction of the valve timing control apparatus 2 including the hydraulic control valve 3 relating to the present embodiment.

1. Basic Construction of Valve Timing Control Apparatus

This valve timing control apparatus 2 includes an outer rotor 21 as a driving rotational member rotatable in synchronism with a crank shaft 11 of the engine 1 and an inner rotor 22 disposed coaxial with the outer rotor 21, the inner rotor 22 acting as a driven rotational member rotatable in synchronism with a cam shaft 12 of the engine 1. The valve timing control apparatus 2 controls opening/closing timing of an intake valve 13 or an exhaust valve 14 by varying a relative rotational phase between the outer rotor 21 and the inner rotor 22. In FIG. 1, the illustration of the hydraulic control valve 3 of the valve timing control apparatus 2 on the side of the exhaust valve 14 is omitted.

The inner rotor 22 is integrally assembled to a leading end of the cam shaft 12 constituting a rotational shaft of a cam for controlling opening/closing of the intake valve 13 or the exhaust valve 14 of the engine 1. The cam shaft 12 is rotatably assembled with a cylinder head of the engine 1.

The outer rotor 21 is mounted outwardly of the inner rotor 22 so as to be rotatable relative thereto within a predetermined rotational phase. Further, along the outer periphery of the outer rotor 21, there is integrally provided a timing sprocket 21a. Between this timing sprocket 21a and a gear 11a fitted on the crank shaft 11 of the engine 1, there is entrained a power transmitting member 15 comprised of a timing chain, a timing belt, or the like.

Then, in response to a rotational drive of the crank shaft 11 of the engine 1, a rotational force is transmitted via the power transmitting member 15 to the timing sprocket 21a. With this, the outer rotor 21 is driven to rotate along a rotational direction S shown in FIG. 2, and further, the inner rotor 22 is rotatably driven to the rotational direction S, thus rotating the cam shaft 12, so that the cam fitted on the cam shaft 12 pushes down the intake valve 13 or the exhaust valve 14 of the engine 1, thus opening the valve 13 or 14.

As shown in FIG. 2, the outer rotor 21 includes a plurality of projections 21b projecting radially inward to act as shoes, the projections 21b being disposed slide by side and spaced apart from each other along the peripheral direction. Between each adjacent pair of projections 21b of the outer rotor 21, there is formed an oil pressure chamber 23 delimited by the outer rotor 21 and the inner rotor 22. In the illustrated example construction, there are provided four such oil pressure chambers 23. In the instant embodiment, this oil chamber pressure 23 corresponds to what is referred to as "a fluid pressure chamber" in the present invention.

Along the outer periphery of the inner rotor 22 and at portions thereof facing the respective oil pressure chambers 23 described above, there are arranged vanes 23 along the radial direction for partitioning each oil pressure chamber 23 between a phase advanced angle chamber 23a and a phase retarded angle chamber 23b in the relative rotational direction (arrowed directions S1, S2 in FIG. 2).

The phase advanced angle chamber 23a of the oil pressure chamber 23 is communicated with a phase advanced angle oil passage 22a formed in the inner rotor 22 whereas the phase retarded angle chamber 23b is communicated with a phase retarded angle oil passage 22b formed in the inner rotor 22. Further, these passages, i.e. the phase advanced angle oil passage 22a and the phase retarded angle oil chamber 23b are connected to the hydraulic control valve 3. In operation, operational oil from the hydraulic control valve 3 is supplied to or discharged from one or both of the phase advanced angle chamber 23a and the phase retarded angle chamber 23b. With this, there is generated an urging force for displacing relative rotational phase between the inner rotor 22 and the outer rotor 23 (this will be referred to simply as "relative rotational phase" hereinafter) in the phase advancing direction S1 (the direction of displacing the vane 24 toward the side of the arrow S1 in FIG. 2) or the phase retarding direction S2 (the direction of displacing the vane 24 toward the side of the arrow S2 in FIG. 2) or maintaining it at a desired phase.

2. Construction of Hydraulic Control Valve

As shown in FIG. 2, the hydraulic control valve 3 effects control of supply or discharge of operational oil to/from one or both of the phase advanced angle chamber 23a and the phase retarded angle chamber 23b. The operational oil is stored in an oil pan 16 and pressure-fed therefrom to the hydraulic control valve 3 by means of an oil pump 17 driven by the drive force of the engine 1. Therefore, in this valve timing control apparatus 2, a hydraulic circuit is constituted between these components, i.e. the hydraulic control valve 3, the phase advanced angle chamber 23a, the phase retarded angle chamber 23b, the oil pump 17 and the oil pan 16.

As shown in FIG. 2, in the present embodiment, there will be described a case wherein a spool valve is employed as the hydraulic control valve 3. The hydraulic control valve 3 includes a valve mechanism 4 for controlling supply of operational oil according to a position of a spool 41, a solenoid mechanism 5 for displacing the position of the spool 41 according to an amount of electric power supplied thereto, and a control unit 6 for controlling the electric power supply mount to this solenoid mechanism 5. In the instant embodiment, the valve mechanism 4 corresponds to what is referred to as "a valve body" in this invention, the spool 41 corresponds to what is referred to as "a valve member" in this invention, the solenoid mechanism 5 corresponds to what is referred to as "an electromagnetic driving means" in this invention, and the control unit 6 corresponds to what is referred to as "a controlling means" in this invention.

The valve mechanism 4 includes a substantially cylindrical sleeve 42 forming a plurality of ports, the spool 41 mounted in a valve chamber 42a formed inside the sleeve 42 to be slidable along the axial direction and a spring 43 for urging the spool 41 toward the solenoid mechanism 5.

The sleeve 42 includes a high pressure port 42b acting as a port communicated with the valve chamber 42a into which the spool 41 is inserted and receiving the operational oil pressure-fed from the oil pump 17, a phase advanced angle port 42c communicated with the phase advanced angle chamber 23a, a phase retarded angle port 42d communicated with the phase retarded angle chamber 23b and two drain ports 41a, 42b communicated with the oil pan 16. The spool 41 includes two lands 41a, 41b partitioning the valve chamber 42a of the sleeve 42. Here, one land disposed on the side of the spring 43 will be referred as the first land 41a, and the other land located on the side of the solenoid mechanism 5 will be referred to as the second land 41b.

Incidentally, the number of ports of the sleeve 42 and the number of lands of the spool 41 will differ correspondingly, depending on the control target to be controlled by the hydraulic control valve 3.

The solenoid mechanism 5 includes a movable core 51, a coil 52, a stator 53 and a yoke 54. The movable core 51 is fixed to a shaft 55 operable in union with the spool 41 and magnetically attracted to the stator 53. The coil 52 generates a magnetic force according to an amount of power supplied thereto to magnetically attract the movable core 51 via the stator 53. The yoke 54 effects receiving and transferring magnetic flux with the movable core 51.

To this solenoid mechanism 5, a pulse width modulated signal is supplied as a control signal from the control unit 6 so as to cause the movable core 51 to be moved to a position corresponding to a duty ratio of this pulse width modulated signal. That is, the coil 52 generates a magnetic force corresponding in its magnitude to the duty ratio of the pulse width modulated signal, thus moving the movable core 51 to a position where this magnetic force is balanced out with the urging force of the spring 43.

Figure 3:
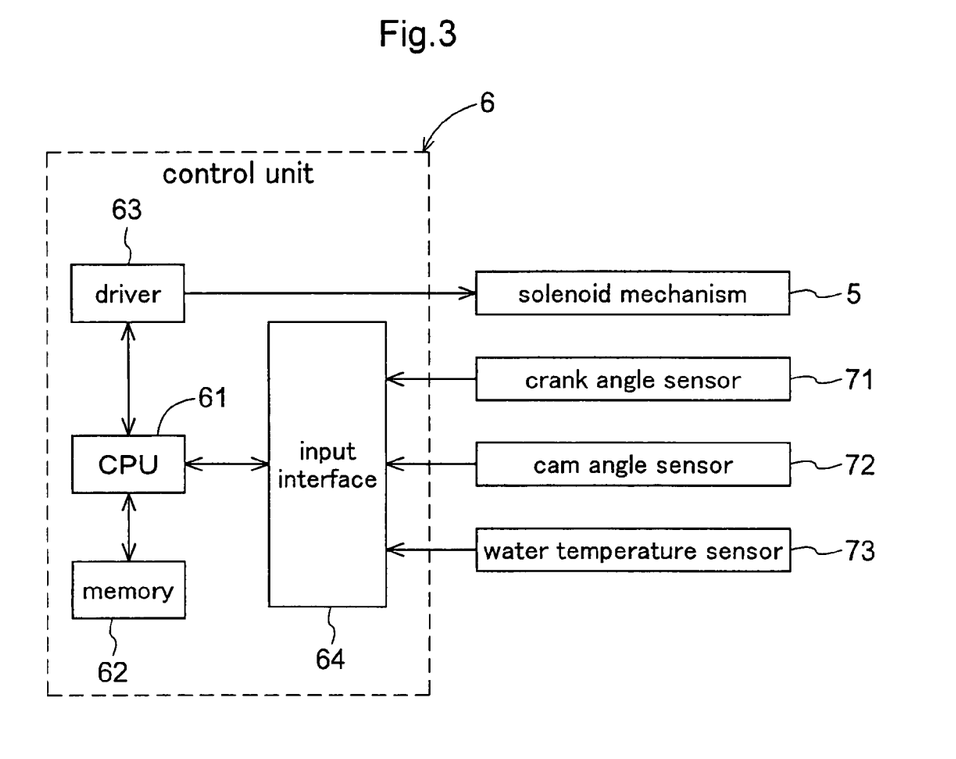
[FIG. 3] a block diagram showing a construction of a control unit of the hydraulic control valve relating to the first embodiment of the present invention.

The control unit 6 outputs the pulse width modulated signal as a control signal to the solenoid mechanism 5 and effects control of an amount of electric current to be supplied to the solenoid mechanism 5 according to the duty ratio of this pulse width modulated signal. In this case, as shown in FIG. 3, the control unit 6 includes a CPU 61 for effecting calculations, a memory 62 storing e.g. a predetermined program, a data table or the like, a driver 63 for controlling the movement of the solenoid mechanism 5, and an input interface 64 for receiving signals from various kinds of sensors. And, as shown also in FIG. 1, the control unit 6 receives, via the input interface 64, detection signals from a crank angle sensor 71 for detecting the phase of the crank shaft, a cam angle sensor 72 for detecting the phase of the cam shaft, and a water temperature sensor 73 for detecting the temperature of engine cooling water. Further, though not shown, in addition to the above, the control unit 6 receives further detection signals from various sensors other than the above, such as a vehicle speed sensor, a throttle opening sensor, etc.

3. Basic Operation of Hydraulic Control Valve

Based on the outputs from the various sensors, the CPU 61 of the control unit 6 calculates a target value for the relative rotational phase between the inner rotor 22 and the outer rotor 21 (to be referred to simply as "target phase" hereinafter). The sensor outputs used in the calculation of this target phase include e.g. a rotational speed of the crank shaft detected by the crank angle sensor 71, a temperature of cooling water for the engine 1 detected by the water temperature sensor 73, a vehicle speed detected by the vehicle speed sensor (not shown), a throttle opening detected by the throttle opening sensor (not shown), etc. Further, the CPU 61 obtains an actual relative rotational phase (to be referred to simply as "actual phase", hereinafter) between the inner rotor 22 and the outer rotor 21 based on the phase of the crank shaft detected by the crank angle sensor 71 and the phase of the cam shaft detected by the cam angle sensor 72.

Then, based on the target phase calculated as above and the actual phase, the CPU 61 calculates a duty ratio to be outputted to the solenoid mechanism 5 so as to vary the relative rotational phase such that the actual phase may agree with the target phase. For this calculation of the duty ratio, a control map, a calculation formula, etc. stored in the memory 62 will be utilized. And, according to the duty ratio calculated by the CPU 61, the driver 63 generates a pulse width modulated signal as a control signal and outputs this to the solenoid mechanism 5. The duty ratio of this pulse width modulated signal determines an apparent value of electric current to be supplied to the solenoid mechanism 5.

Figure 4:
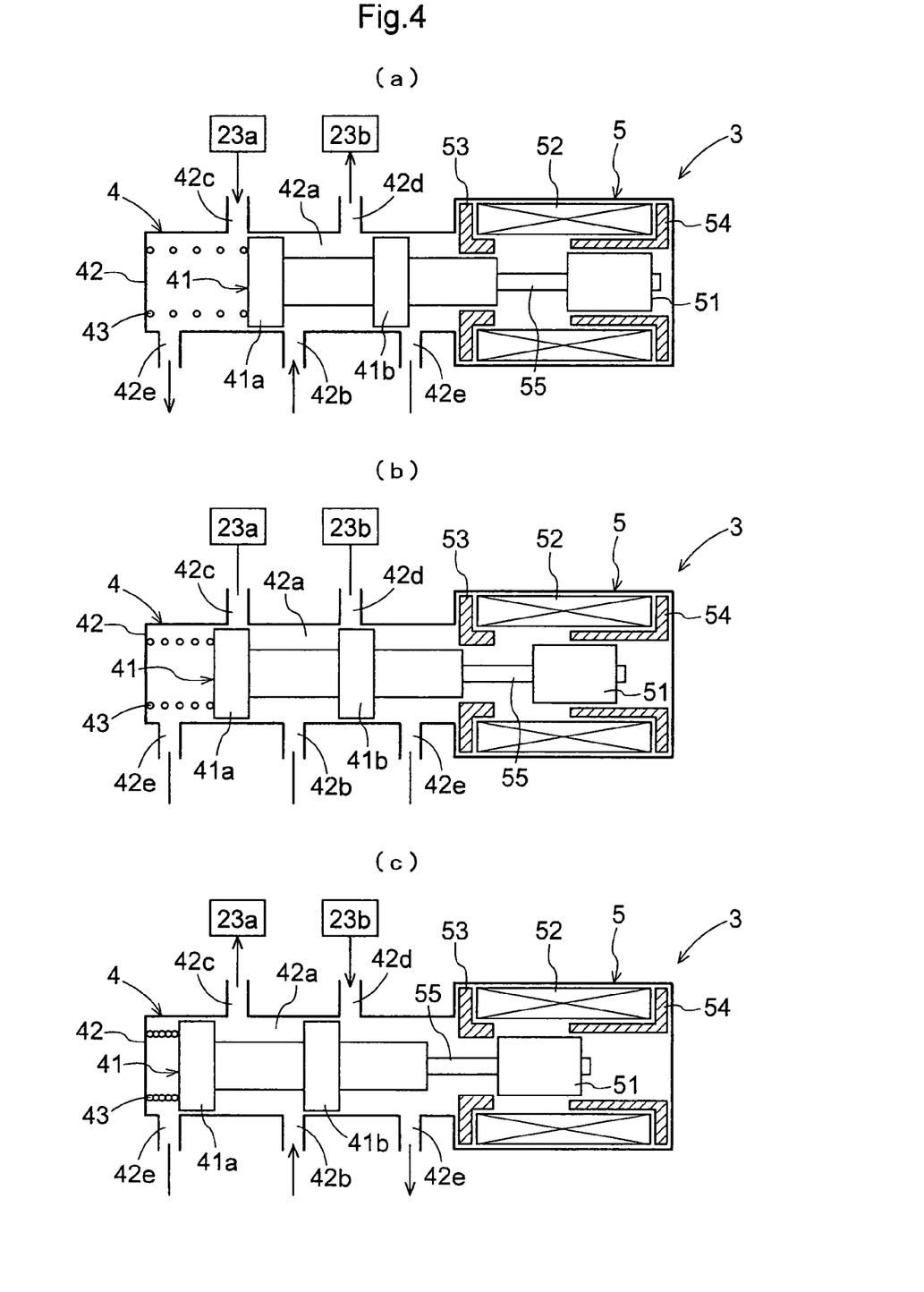
[FIG. 4] an explanatory view illustrating switching conditions of operational oil passages according to various positions of the spool in the hydraulic control valve relating to the first embodiment of the present invention.

Then, the solenoid mechanism 5 will be operated according to the duty ratio of the pulse width modulated signal outputted from the control unit 6, so as to displace the spool 41 of the valve mechanism 4 to a position corresponding to the duty ratio, against the urging force of the spring 43. FIG. 4 shows switchovers of operational oil passages according to various positions of the spool 41 of the valve mechanism 4.

FIG. 4 (a) shows a condition when the duty ratio has the lowest value (e.g. 0%) so that the spool 41 is located at its initial position. Under this condition, the spool 41 establishes communication between the high pressure port 42b and the phase retarded angle port 42d and also communication between the drain ports 42e and the phase advanced angle port 42c. Therefore, the operational oil pressure-fed from the oil pump 17 is supplied to the phase retarded angle chamber 23b, whereas the operational oil present within the phase advanced angle chamber 23a is discharged (drained) to the oil pan 16. With this, the pressure of the operational oil within the phase retarded angle chamber 23b is increased whereas the pressure of the operational oil within the phase advanced angle chamber 23a is reduced. As a result, the relative rotational phase is displaced to the phase retarding direction S2 (see FIG. 2).

FIG. 4 (b) shows a condition when the duty ratio has an intermediate value (e.g. 50%) so that the spool 41 is located at its intermediate position. Under this condition, the first land 41a of the spool 41 closes the phase advanced angle port 42c and the second land 41b closes the phase retarded angle port 42d. That is, the spool 41 is located at a closing position for closing both the phase retarded angle port 42d and the phase advanced angle port 42c, whereas the high pressure port 42b and the drain ports 42e are communicated with neither ports. Therefore, the pressures of the operational oil inside the phase advanced angle chamber 23a and the phase retarded angle chamber 23b are maintained, so that the relative rotational phase is maintained at its present position.

FIG. 4 (c) shows a condition when the duty ratio has the highest value (e.g. 100%) so that the spool 41 is located at its maximum stroke position. Under this condition, the spool 41 establishes communication between the high pressure port 42b and the phase advanced angle port 42c and also communication between the drain ports 42e and the phase retarded angle port 42c. Therefore, the operational oil pressure-fed from the oil pump 17 is supplied to the phase advanced angle chamber 23a, whereas the operational oil present within the phase retarded angle chamber 23b is discharged (drained) to the oil pan 16. With this, the pressure of the operational oil within the phase advanced angle chamber 23a is increased whereas the pressure of the operational oil within the phase retarded angle chamber 23b is reduced. As a result, the relative rotational phase is displaced to the phase advancing direction S1 (see FIG. 2).

With the above-described movements, the hydraulic control valve 3 effects control for displacing the relative rotational phase between the inner rotor 22 and the outer rotor 21 according to operational conditions of the engine 1 detected by the various sensors. The above is the basic operations of the hydraulic control valve 3.

4. Inventive Characterizing Construction of Hydraulic Control Valve

Next, there will be explained characterizing operation control relating to the present invention for the hydraulic control valve 3 according to the instant embodiment. Namely, the control unit 6 is configured to effect a control scheme for varying the pulse width modulated signal so as to vary the amplitude of oscillation of the spool 41 in the valve mechanism 4 according to conditions of both the temperature and the pressure of the operational oil. In this case, the control operation is effected for varying the frequency of the pulse width modulated signal as a control signal to be outputted to the solenoid mechanism 5. Incidentally, there is a nearly proportional relationship between the temperature of the operational oil and the cooling water temperature (water temperature) of the engine 1. Also, since the pressure of the operational oil inside the hydraulic circuit is determined based on the discharge pressure of the oil pump 17 driven by the engine 1, there exists a nearly proportional relationship with the rotational speed of the engine 1. Then, in the instant embodiment, based on the cooling water temperature of the engine 1 detected by the water temperature sensor 73, the temperature of the operational oil is judged and based on the rotational speed of the crank shaft detected by the crank angle sensor 71, the pressure of the operational oil is judged.

Figure 5:
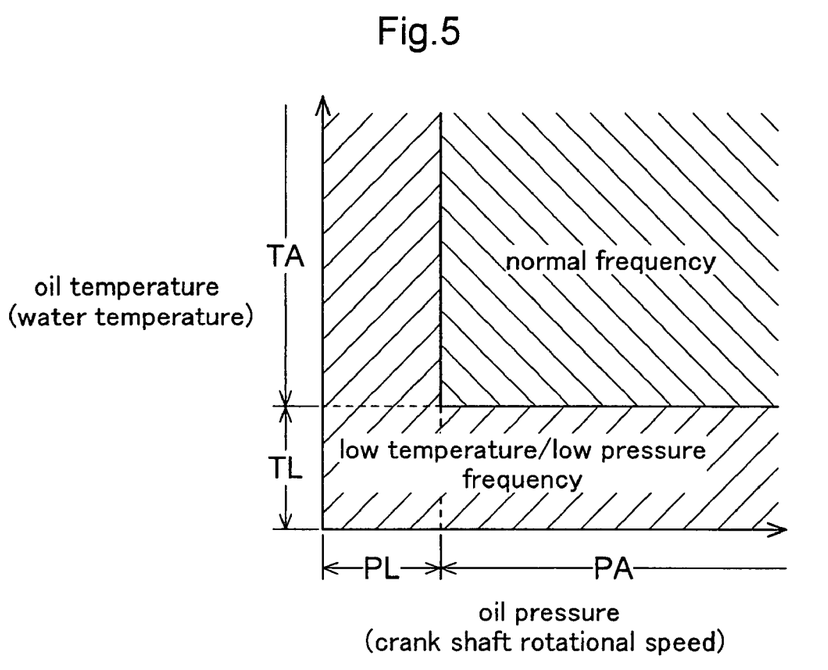
[FIG. 5] a view showing a map which specifies pulse width modulated signals in the hydraulic control valve relating to the first embodiment of the present invention.

More particularly, as shown in FIG. 5, the control unit 6 executes a control scheme for varying the pulse width modulated signal so as to increase the amplitude of the oscillation of the spool 41 and outputs this varied signal to the solenoid mechanism 5, in case the temperature of the operational oil is within a low temperature range TL which is lower than a normal temperature range TA and also when the pressure of the operational oil is within a low pressure range PL which is lower than a normal pressure range PA, provided that the oil temperature is within the normal temperature range TA. Values of the low temperature range TL and the low pressure range PL are stored in the memory 62 in the form of a map as shown in FIG. 5 in association with frequency values of the pulse width modulated signal to be described later.

Here, the "normal temperature range TA" refers to a temperature range of the operational oil which is assumed to be in normal use in the valve timing control apparatus 2 including this hydraulic control valve 3. For example, in the case of a valve timing control apparatus 2 for use in a passenger automobile engine, the normal temperature range TA will be a temperature range of 10~110°. Therefore, in this case, the low temperature range TL will be a temperature range lower than 10°.

Similarly, the "normal pressure range PA" refers to a pressure range of the operational oil which is assumed to be in normal use in the valve timing control apparatus 2. For example, in the case of the valve timing control apparatus 2 for use in a passenger automobile engine, the normal pressure range PA will be a pressure range of 100 kPa~400 kPa. Therefore, in this case, the low pressure range PL will be a pressure range lower than 100 kPa. Incidentally, in the case of the low temperature range TL, due to the higher viscosity of the operational oil, the pressure will be a high pressure equal to or near a valve opening pressure of a relief valve of the oil pump 17.

Incidentally, it is also possible to configure the control unit 6 to effect the control operation directly based on the cooling water temperature of the engine 1, without judging the temperature of the operational oil based on the cooling water temperature of the engine 1. In this case, the range of the cooling water temperature corresponding to the above-described low temperature range TL will be determined in advance and this range, instead of the low temperature range TL, will be stored in the form of a map in the memory 62 in association with the frequencies of the pulse width modulated signal. Then, the control operation is effected for varying the pulse width modulated signal so as to increase the amplitude of the oscillation of the spool 41 and outputting this varied signal to the solenoid mechanism 5, when the cooling water temperature is within such temperature range.

Similarly, it is also possible to configure the control unit 6 to effect the control operation directly based on the rotational speed of the crank shaft, without judging the pressure of the operational oil based on the crank shaft rotational speed. In this case, the range of the crank shaft rotational speed corresponding to the above-described low pressure range PL will be determined in advance and this range, instead of the low pressure range PL, will be stored in the form of a map in the memory 62 in association with the frequencies of the pulse width modulated signal. Then, the control operation is effected for varying the pulse width modulated signal so as to increase the amplitude of the oscillation of the spool 41 and outputting this varied signal to the solenoid mechanism 5, when the crank shaft rotational speed is within such rotational speed range.

And, the pulse width modulated signal for increasing the amplitude of the oscillation of the spool 41 can be a pulse width modulated signal having a lower frequency than the normal frequency range. Namely, by reducing the frequency of the pulse width modulated signal to be outputted to the solenoid mechanism 5, the duration of the ON signal and the duration of the OFF signal both included in the pulse width modulated signal are extended respectively. With this, in one cycle period of the pulse width modulated signal, the period in which the spool 41 is operated toward the spring 43 by the magnetic force from the solenoid mechanism 5 and the period in which the spool 41 is operated toward the solenoid mechanism 5 by the urging force of the spring 43 (see FIG. 2) will be extended respectively. As a result, the amplitude of the spool 41 movement will be increased.

Figure 6:
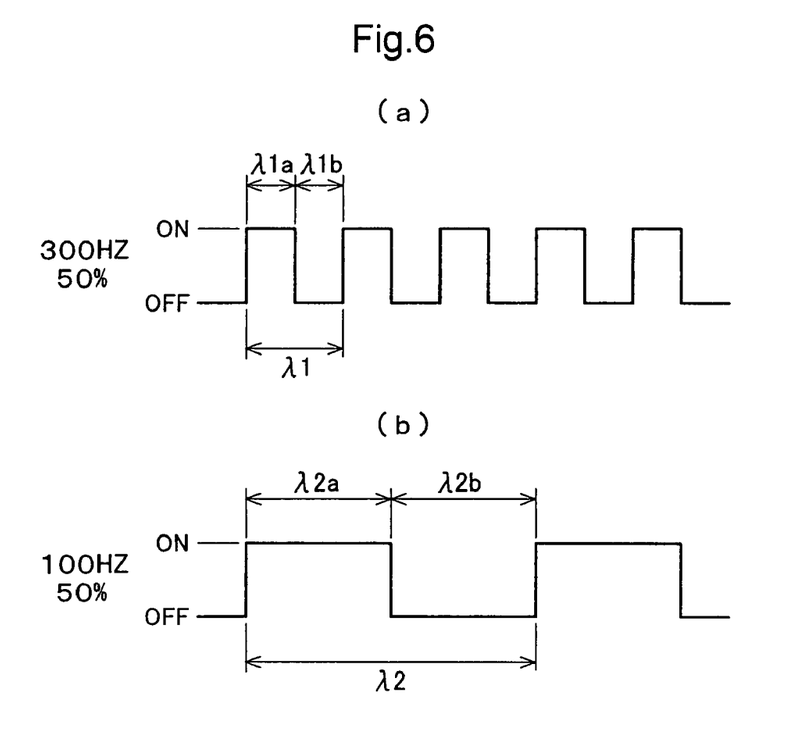
[FIG. 6] a view showing waveforms of pulse width modulated signals of differing frequencies in comparison with each other.

FIG. 6 shows, as one such example, (a) a waveform of a pulse width modulated signal having a frequency of 300 Hz and a duty ratio of 50% in comparison with (b) a waveform of a pulse width modulated signal having a frequency of 100 Hz and the duty ratio of 50%. As shown in this figure, the 100 Hz pulse width modulated signal has a wavelength $\lambda 2$ which is three times greater than a wavelength $\lambda 1$ of the 300 Hz pulse width modulated signal. Therefore, respecting the durations of the ON signal and OFF signal also, the duration$\lambda 2a$ of the ON signal and the duration$\lambda 2b$ of the OFF signal of the 100 Hz pulse width modulated signal are respectively three times the duration$\lambda 1a$ of the ON signal and the duration$\lambda 1b$ of the OFF signal of the 300 Hz pulse width modulated signal. And, in the duration of the ON signal, the spool 41 will be moved within the sleeve 42 continuously toward the spring 43 side, whereas in the duration of the OFF signal, the spool 41 will be moved within the sleeve 42 continuously toward the solenoid mechanism 5 side. Accordingly, the amplitude of the oscillation of the spool 41 will be increased, according to the durations of the ON signal and the OFF signal of the pulse width modulated signal. Incidentally, when the frequency of the pulse width modulated signal is increased, thus rendering the durations of the ON signal and OFF signal significantly short, the ON and OFF conditions will be switched over before the spool 41 starts moving in either direction. In such case, though the situation may differ depending on the viscosity (temperature) of the operational oil, the spool 41 will be hardly oscillated.

In this embodiment, as shown in FIG. 5, as the low frequency lower than the normal frequency used when the temperature of the operational oil is in the low temperature range TL or the pressure of the operational oil is in the low pressure range PL, there is employed a low temperature/low pressure frequency determined in advance. As a value for this low temperature/low pressure frequency, there is employed a value determined in advance and stored in the memory 62 as a frequency vale for realizing appropriate amplitude of oscillation of the spool 41 of the valve mechanism 4.

In this example, such "appropriate" amplitude of the spool 41 when the temperature of the operational oil is in the low temperature range TL or the pressure of the operational oil is in the low pressure range PL can be an amplitude which satisfies following two conditions.

The first condition is securement of responsiveness of the spool 41 movement according to the duty ratio of the pulse width modulated signal as a control signal in the case of high viscosity of the operational oil due to the temperature of the operational oil being in the low temperature range TL. In this, it is preferred that the viscosity of the operational oil be set to correspond to the highest viscosity conceivable. Further, the required responsiveness of the movement of the spool 41 will be determined in accordance with a speed needed for feeding the operational oil to the phase advanced angle chamber 23*a* and the phase retarded angle chamber 23*b* of the valve timing control apparatus 2.

The second condition is the requirement that when the pressure of the operational oil is within the low pressure range PL and the spool 41 is at the closing position for closing both the phase retarded angle port 42d and the phase advanced angle port 42c, as shown in FIG. 4 (b), oscillation of the spool 41 instantaneously establish communication of the phase advanced angle port 42c and the phase retarded angle port 42d respectively with the high pressure port 42b. That is, when the spool 41 is located at the closing position, basically, no operational oil is supplied to the downstream side of the hydraulic control valve 3. For this reason, when the pressure of the operational oil is within the low pressure range PL, there can occur a situation that due to e.g. leak of the operational oil inside the fluid circuit, the pressure of the operational oil on the downstream side of the hydraulic control valve 3 falls blow the required pressure. Then, the spool 41 will be oscillated so as to establish momentary communication of the phase advanced angle port 42c and the phase retarded angle port 42d respectively with the high pressure port 42b. With this, a small amount of operational oil is supplied from both the phase advanced angle port 42c and the phase retarded angle port 42d, thereby compensating for the shortage in the operational oil, thus maintaining appropriate oil pressure.

The value of such appropriate low temperature/low pressure frequency satisfying the above-described two conditions will differ, depending on such factors as the masses of the movable core 51 and the shaft 55 of the solenoid mechanism 5, the movable components of the valve mechanism 4 such as the spool 41, the load of the spring 43, the seal width of the valve mechanism 4, the viscosity of the operational oil, etc. Then, the optimal value of the low temperature/low pressure frequency needs to be determined experimentally, in accordance with the characteristics of the hydraulic control valve 3.

Further, in addition to the above-described control operation according to the temperature and pressure of the operational oil, the control unit 6 effects a further control operation of varying the frequency of the pulse width modulated signal as a control signal to be outputted to the solenoid mechanism 5, upon detection of a malfunction of the spool 41.

Specifically, the CPU 61 of the control unit 6 controls the hydraulic control valve 3 to a direction for bringing, closer to the target phase, the actual phase which is calculated from the phase of the crank shaft detected by the crank angle sensor 71 and the phase of the cam shaft detected by the cam angle sensor 72. Hence, if the actual phase does not approach the target phase in spite of such control being effected, this is judged due to a malfunction of the spool 41. Then, if the situation is judged as such malfunction of the spool 41, the control unit 6 varies the frequency of the pulse width modulated signal to a lower frequency than the normal frequency and outputs such varied signal to the solenoid mechanism 5.

In the instant embodiment, as such low frequency lower than the normal frequency for use in the event of malfunction of the spool 41, there is employed a predetermined abnormality frequency. And, as a value of this predetermined abnormality frequency, there is employed a value which is predetermined and stored in the memory 62 as a frequency for an appropriate amplitude of oscillation of the spool 41 suitable for e.g. removal of a foreign object entrapped at the sliding portion between the spool 41 and the sleeve 42. As such amplitude of the spool 41 movement and such abnormality frequency of the pulse width modulated signal required therefor differ depending on the shapes of the spool 41 and the sleeve 42, the kind of the foreign object contained in the operational oil, etc., an optimal value thereof needs to be determined experimentally.

Second Embodiment

Figure 8:
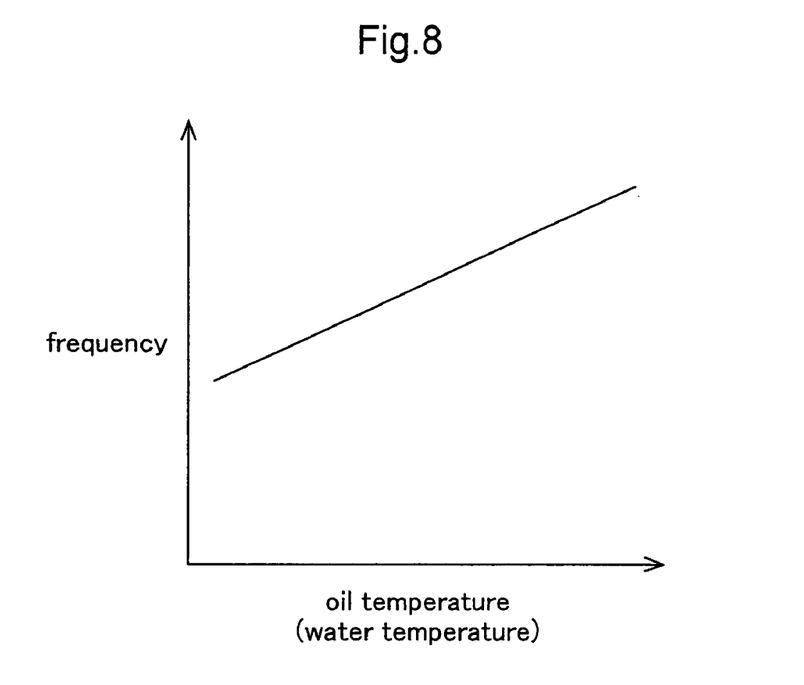
[FIG. 8] a view showing a map which specifies pulse width modulated signals in a hydraulic control valve relating to a second embodiment of the present invention.

Next, a second embodiment of the present invention will be described. The constructions of the valve timing control apparatus 2 and the hydraulic control valve 3 relating to this embodiment are same as those in the foregoing embodiment and therefore description thereof will be omitted. In this embodiment, the control unit 6 executes a control scheme of varying frequency of the pulse width modulated signal based solely on the condition of operational oil temperature. Also, in doing this, the unit does not employ a signal value as the frequency of the pulse width modulated signal to be varied, but varies it into difference frequencies, depending on the value of the operational oil temperature. FIG. 8 shows an example of a map tabulating the relationship between temperatures of the operational oil and frequencies of the pulse width modulated signal.

As shown in this FIG. 8, in the instant embodiment, the map defines a linear relationship that as the temperature of the operational oil becomes higher, the frequency of the pulse width modulated signal is made higher as well. This map is stored in the memory 62 of the control unit 6. The values for the frequency of the pulse width modulated signal tabulated in this map are determined such that an oscillation of the spool 41 according to the condition, e.g. the viscosity, of the operational oil at each temperature ensures responsiveness in the movement of the spool 41 according to the duty ratio of the pulse width modulated signal. In this, it is preferred that the viscosity of the operational oil be set to correspond to the highest viscosity conceivable. Further, the required responsiveness of the movement of the spool 41 will be determined in accordance with a speed needed for feeding the operational oil to the phase advanced angle chamber 23a and the phase retarded angle chamber 23b of the valve timing control apparatus 2.

Incidentally, in this embodiment too, like the first embodiment described above, the construction can be modified so as to determine the temperature of the operational oil based on the cooling water temperature of the engine 1 detected by the water temperature sensor 73, or the control operation may be effected directly, based on the cooling water temperature of the engine 1.

Third Embodiment

Figure 9:
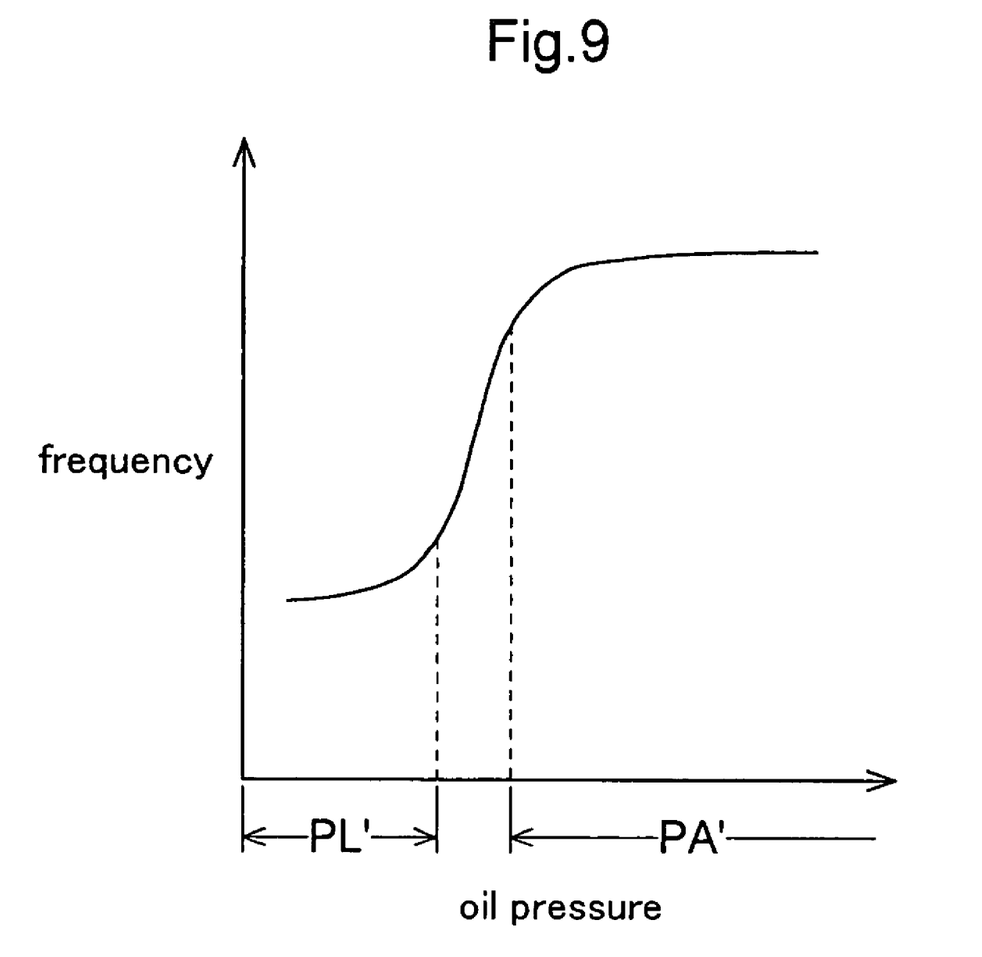
[FIG. 9] a view showing a map which specifies pulse width modulated signals in a hydraulic control valve relating to a third embodiment of the present invention.

Next, a third embodiment of the present invention will be described. The constructions of the valve timing control apparatus 2 and the hydraulic control valve 3 are same as those relating to the foregoing embodiment and therefore description thereof will be omitted. In this embodiment, the control unit 6 executes a control scheme of varying frequency of the pulse width modulated signal based solely on the condition of operational oil pressure. Also, in doing this, the unit does not employ a signal value as the frequency of the pulse width modulated signal to be varied, but varies it into difference frequencies, depending on the value of the operational oil pressure. FIG. 9 shows an example of a map defining the relationship between pressures of the operational oil and frequencies of the pulse width modulated signal.

Figure 7:
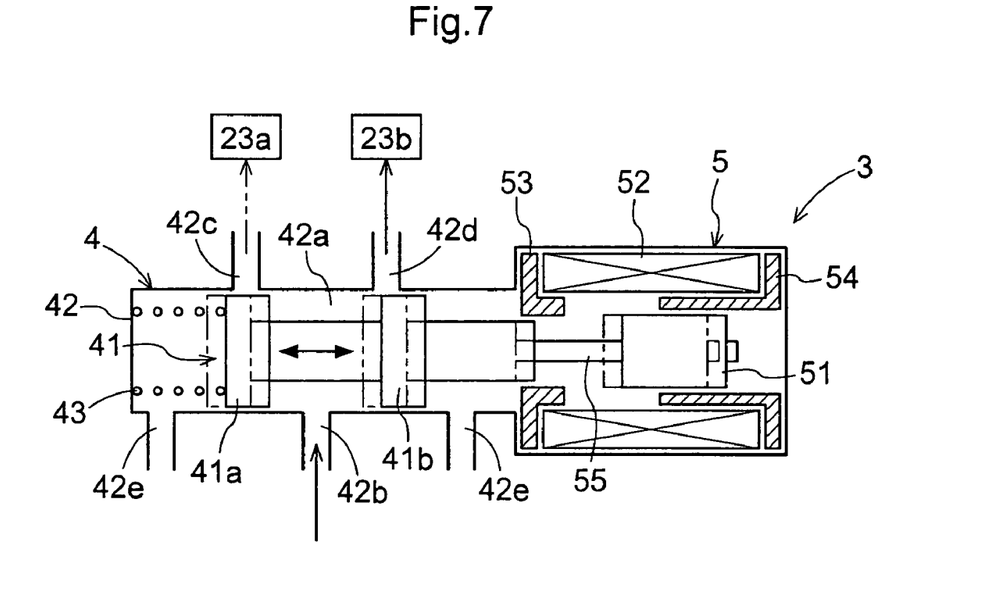
[FIG. 7] an explanatory view illustrating movements when the spool is located at a closing position in the hydraulic control valve relating to the first embodiment of the present invention.

As shown in this FIG. 9, in the instant embodiment, the map defines a non-linear relationship that when the operational oil pressure is within the low pressure range PL', the frequency of the pulse width modulated signal is reduced, and when the operational oil pressure has approximately exceeded the low pressure range PL', the frequency is increased sharply and further when the operational oil pressure has reached the normal pressure range PA', the frequency is maintained substantially constant. This map is stored in the memory 62 of the control unit 6. The values for the frequency of the pulse width modulated signal tabulated in this map are determined so as to secure such oscillation amplitude of the spool 41 for instantaneously establishing the communication between each of the phase advanced angle port 42c and the phase retarded angle port 42d with the high pressure port 42b if the spool 41 is located at the closing position for closing both the phase advanced angle port 42c and the phase retarded angle port 42d as shown in FIG. 7 when the operational oil pressure is within the low pressure range PL', whereas, no unnecessary oscillation of the spool 41 will occur when the operational oil pressure is within the normal pressure range PA'.

Incidentally, in this embodiment too, like the first embodiment described above, the construction can be modified so as to determine the pressure of the operational oil based on the crank shaft rotational speed detected by the crank angle sensor 71, or the control operation may be effected directly, based on the crank shaft rotational speed.

Other Embodiments (1) In the respective foregoing embodiments, as the pulse width modulated signal for increasing the amplitude of oscillation of the spool 41 (valve member), there is employed the pulse width modulated signal having a lower frequency than the normal frequency. However, the pulse width modulated signal for increasing the amplitude of oscillation of the spool 41 is not limited thereto. That is, the amplitude of oscillation of the spool 41 can be increased also by periodically varying the duty ratio while keeping the frequency of the pulse width modulated signal constant. For instance, in case the frequency is 300 Hz, by executing a control scheme of outputting a signal of 100% duty ratio three times in a row and then outputting a signal of 0% duty ratio three times in a row, it is possible to output a signal having a same wavelength as a pulse width modulated signal having frequency of 100 Hz and a duty ratio of 50%. Therefore, such control scheme of the pulse width modulated signal too is one preferred embodiment of the present invention.

(2) In the respective foregoing embodiments, as the control scheme according to the temperature of the operational oil, there have been described the construction of determining the operational oil temperature based on the cooling water temperature of the engine 1 detected by the water temperature sensor 73 and the construction of directly effecting the control operation based on the cooling water temperature of the engine 1. However, the construction of the control scheme according to the temperature of the operational oil is not limited to these. For instance, another preferred embodiment will be a modified construction in which an oil temperature sensor capable of directly detecting the operational oil temperature is incorporated within the hydraulic circuit and the pulse width modulated signal is varied so as to increase the amplitude of the valve member movement based on the operational oil temperature detected by this oil temperature sensor and this varied signal is outputted.

Similarly, in the respective foregoing embodiments, as the control scheme according to the pressure of the operational oil, there have been described the construction of determining the operational oil pressure based on the crank shaft rotational speed detected by the crank angle sensor 71 and the construction of directly effecting the control operation based on the crank shaft rotational speed. However, the construction of the control scheme according to the pressure of the operational oil is not limited to these. For instance, another preferred embodiment will be a modified construction in which an oil pressure sensor capable of directly detecting the operational oil pressure is incorporated within the hydraulic circuit and the pulse width modulated signal is varied so as to increase the amplitude of the valve member movement based on the operational oil pressure detected by this oil pressure sensor and this varied signal is outputted.

(3) In the respective foregoing embodiments described above, there have been described the cases in which the valve timing control apparatus 2 of the engine 1 is applied to the hydraulic control valve 3. However, the application of the present invention is not limited thereto. The invention can be used as a hydraulic control valve for controlling various kinds of hydraulic devices and can be used even as a control valve for various kinds of fluid other than oil.

| DESCRIPTION OF REFERENCE MARKS | |
|---|---|
| 1: | internal combustion engine |
| 2: | valve timing control apparatus |
| 3: | hydraulic control valve (fluid control valve) |
| 4: | valve mechanism (valve body) |
| 5: | solenoid mechanism (electromagnetic driving means) |
| 6: | control unit (controlling means) |
| 11: | crank shaft |
| 12: | cam shaft |
| 21: | outer rotor (driving rotational member) |
| 22: | inner rotor (driven rotational member) |
| 23: | oil pressure chamber (fluid pressure chamber) |
| 23a: | phase advanced angle chamber |
| 23b: | phase retarded angle chamber |

-continued

DESCRIPTION OF REFERENCE MARKS

| | |
|---|---|
| 41: | spool (valve member) |
| 42c: | phase advanced angle port (supply port) |
| 42d: | phase retarded angle port (supply port) |
| TA: | normal temperature range |
| TL: | low temperature range |
| PA: | normal pressure range |
| PL: | low pressure range |

The invention claimed is:

1. A valve timing control apparatus comprising:
a driving rotational member rotatable in synchronism with a crank shaft of an internal combustion engine;
a driven rotational member disposed coaxial with said driving rotational member and rotatable in synchronism with a cam shaft of the internal combustion engine;
a fluid pressure chamber formed in at least one of said driving rotational member and said driven rotational member, said fluid pressure chamber being divided into a phase advanced angle chamber and a phase retarded angle chamber; and
a fluid control valve for controlling supply or discharge of operational fluid to/from one or both of said phase advanced angle chamber and said phase retarded angle chamber, said fluid control valve comprising: a valve body for controlling supply of fluid according to a position of a valve member, an electromagnetic driving means for displacing a position of the valve member according to an amount of power supplied thereto, and a controlling means for controlling the power supply amount to the electromagnetic driving means by a duty ratio of a pulse-width modulated signal;
wherein said controlling means varies a pulse width modulated signal so as to increase the oscillation amplitude of the valve member while maintaining the duty ratio to be an intermediate ratio, provided at least that the valve member is located at a closing position for closing both a phase advanced port and a phase retarded port, when the pressure of the fluid is within a low pressure range lower than a normal pressure range, and outputs the signal to the electromagnetic driving means.

2. The valve timing control apparatus according to claim 1, wherein said controlling means varies frequency of the pulse width modulated signal to a low frequency lower than a normal frequency range so as to increase the oscillation amplitude of the valve member and outputs the signal to the electromagnetic driving means.

3. A valve timing control apparatus comprising:
a driving rotational member rotatable in synchronism with a crank shaft of an internal combustion engine;
a driven rotational member disposed coaxial with said driving rotational member and rotatable in synchronism with a cam shaft of the internal combustion engine;
a fluid pressure chamber formed in at least one of said driving rotational member and said driven rotational member, said fluid pressure chamber being divided into a phase advanced angle chamber and a phase retarded angle chamber; and
a fluid control valve for controlling supply or discharge of operational fluid to/from one or both of said phase advanced angle chamber and said phase retarded angle chamber, said fluid control valve comprising: a valve body for controlling supply of fluid according to a position of a valve member, an electromagnetic driving means for displacing a position of the valve member according to an amount of power supplied thereto, and a controlling means for controlling the power supply amount to the electromagnetic driving means by a duty ratio of a pulse-width modulated signal;
wherein said controlling means varies frequency of a pulse width modulated signal to a lower frequency than a normal frequency and then outputs the pulse width modulated signal to the electromagnetic driving means, upon detection of a malfunction of said valve member, said malfunction being detected by detection of an actual phase not approaching a target phase in spite of a control being effected.

* * * * *